3,509,128
**PROCESS FOR PURIFYING URIDINE-5'-DIPHOS-
PHATE AND URIDINE-5'-TRIPHOSPHATE**
Yasuo Fujimoto and Masayuki Teranishi, Tokyo, Japan,
  assignors to Kyowa Hakko Kogyo Kabushiki Kaisha
  (Kyowa Hakko Kogyo Company Limited), Tokyo-to,
  Japan, a body corporate of Japan
    Filed Mar 20, 1968, Ser. No. 714,598
  Claims priority, application Japan, Mar. 24, 1967,
            42/18,025
          Int. Cl. C07d 51/50
U.S. Cl. 260—211.5                           7 Claims

ABSTRACT OF THE DISCLOSURE

A process for separating and purifying uridine-5'-diphosphate (hereinafter designated as UDP) and uridine-5'-triphosphate (hereinafter designated as UTP), which are important in metabolic processes in living bodies, from an aqueous solution of UDP and/or UTP by contacting the said aqueous solution with a strongly basic anion exchange resin in salt form, eluting the absorbed UDP and/or UTP from the said strongly basic resin with an acidic solution of an alkali metal salt and/or an acid addition salt of an organic base contacting, the said eluate fractions with a weakly basic anion exchange resin in salt form whereby UDP and/or UTP is selectively adsorbed on the said weakly basic resin, and eluting the adsorbed UDP and/or UTP from the said weakly basic resin with an alkaline solution.

BACKGROUND OF INVENTION AND DESCRIPTION OF PRIOR ART

Figure 1:
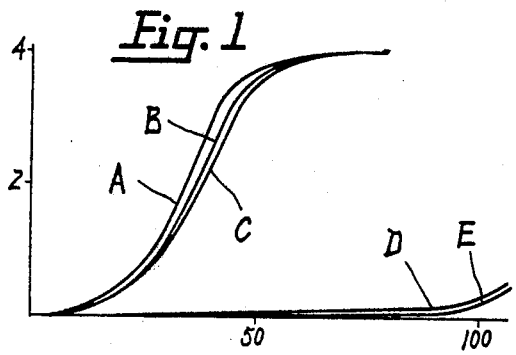

UDP and UTP are important compounds in metabolic processes in living bodies since they are able to provide activated phosphoric acid for use in various biological reactions, and are also capable of promoting the formation of certain coenzyme sources.

Various methods have been proposed for the purification or separation of nucleoside-5'-diphosphates and -triphosphates, particularly ion-exchange methods. These methods however often suffer from a number of disadvantages such as operational difficulties and uneconomical working.

Furthermore, UDP and, more especially, UTP are unstable to alkalies and very unstable to acids and heat and therefore when UDP and/or UTP are subjected to ion-exchange methods on an industrial scale the eluate obtained must be highly concentrated in order to recover UDP and UTP economically. However, the concentration of solutions of UDP and UTP in vacuo at very low temperatures and in the shortest possible time is a difficult and uneconomical operation especially when carried out on an industrial scale.

Although UDP and UTP may be absorbed on a strongly basic anion exchange resins, it is necessary to use a concentrated solution of an acid or neutral salt as eluent to obtain a highly concentrated eluate. Therefore, when an acid is used, the UDP and UTP which is obtained may be decomposed, or alternatively when a solution of a neutral salt is used as eluent, the eluate obtained may be contaminated with large amounts of inorganic salt thereby giving rise to difficulties in the separation thereof.

SUMMARY OF INVENTION

It is an object of the present invention to provide an improved process for the purification of UDP and/or UTP from an aqueous solution thereof by the use of an ion-exchange method whereby concentrated solutions of UDP or UTP may be obtained.

The new process is particularly applicable to the purification of UDP or UTP contained in fermentation broths or reaction media of a chemical synthesis.

According to the present invention, we provide a process for separating UDP and/or UTP in aqueous solution from nucleotide and/or nucleoside polyphosphate impurities contained therein, which process comprises contacting the said aqueous solution with a strongly basic anion exchange resin in salt form whereby UDP and/or UTP contained in the said aqueous solution is selectively absorbed on the said strongly basic resin, eluting the adsorbed UDP and/or UTP from the said strongly basic resin by means of an acidic solution of an alkali metal salt and/or an acid addition salt of an organic base and/or an inorganic or organic acid whereby separate eluate fractions rich in UDP (when present on the said strongly basic resin) and UTP (when present on the said strongly basic resin) are obtained, contacting the said eluate fractions with a weakly basic anion exchange resin in salt form whereby UDP and/or UTP is selectively absorbed on the said weakly basic resin, and eluting the absorbed UDP and/or UTP from the said weakly basic resin by means of an alkaline solution whereby fractions containing purified UDP (when present on the said weakly basic resin) and separate fractions containing purified UTP (when present on the said weakly basic resin) are obtained.

It will be appreciated that the eluate fractions which are obtained from the strongly basic anion exchange resin and which are rich in UDP may contain minor amounts of UTP; likewise eluate fractions rich in UTP may contain minor amounts of UDP. In these cases, the UDP and UTP will together be absorbed on the weakly basic anion exchange resin and will then be selectively eluted therefrom to provide separate fractions containing purified UDP and purified UTP respectively.

The strongly basic anion exchange resin is preferably in the Cl, bicarbonate, formate or acetate form prior to elution, in which case the above-mentioned alkali metal is an alkali metal chloride, bicarbonate, formate or acetate, for example, lithium, sodium or potassium chloride, bicarbonate, formate or acetate, and the above-mentioned acid addition salt of an organic base may be, for example, a quaternary ammonium salt such as trimethylammonium bicarbonate, chloride, formate or acetate; trimethylammonium bicarbonate, chloride, formate or acetate; tripropylammonium bicarbonate, chloride, formate or acetate; or tributylammonium bicarbonate, chloride, formate or acetate.

The acidic solution used as eluent in the process according to the invention is advantageously one containing hydrochloric acid, sulphuric acid, nitric acid, formic acid or acetic acid. A particularly preferred eluent according to the invention when the strongly basic anion exchange resin is in the Cl form is an aqueous solution of sodium or lithium chloride and hydrochloric acid.

The eluate obtained by elution of the strongly basic anion exchange resin is generally a dilute solution of UDP and/or UTP, which is concentrated by contacting with the weakly basic resin to obtain pure UDP or UTP. Owing to the selective adsorption of UDP and UTP on the anion-exchange resin, the resulting eluate will usually contain a predominant amount of one or the other of the two compounds depending on the nature of the eluent. The aqueous solution of UDP and/or UTP obtained as eluate fractions from the strongly basic anion exchange resin in the process according to the invention are further purified by contacting said aqueous solution with the weakly basic anion exchange resin (e.g. of the phenol- or styrene-aliphatic amine type) in the salt form (for example, chloride, bicarbonate, formate or acetate form) whereby said UDP and/or UTP is selectively adsorbed on said resin, and eluting the adsorbed UDP and/or UTP from the resin by means of an alkaline solution, whereby a separation of UDP and UTP is obtained when both are present in the aqueous solution.

We have carried out experiments to determine the adsorption capacities of certain weakly basic anion exchange resins in the Cl, OH or acetate forms: In these experiments a dilute solution of UTP containing 3.0 mg./ml. of UTP (calculated as free UTP anhydride) or a dilute solution of UDP containing 4.0 mg./ml. of UDP (calculated as free UDP anhydride) was respectively mixed with a UTP or UDP fraction containing an alkali metal chloride, an acid salt of an organic base and an acid; these mixtures were passed through different resin columns. The resin columns were packed with 10 ml. of a different weakly basic anion exchange resins in their OH, Cl or acetate forms for the purpose of determining the relationship between the volume of the eluate and the concentration of the UTP or UDP contained therein. The results obtained are shown in FIGS. 1 and 2 of the accompanying drawings.

In FIGURE 1 which sets out in the form of a graph the results obtained for the elution of UDP, the curves A–E represents the different results obtained using the following weakly basic anion exchange resins:

A—Duolite A7 (OH form)
B—Duolite A2 (OH form)
C—Duolite A6 (OH form)
D—Duolite A7 (Cl or acetate form)
E—Duolite A2 (Cl or acetate form)

Figure 2:
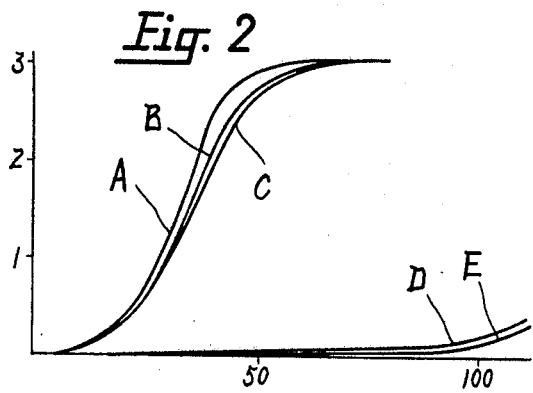

Likewise in FIGURE 2 which sets out the results obtained for the elution of UTP, the curves A–E represent the different results obtained using the weakly basic anion exchange resins mentioned in connection with FIGURE 1.

It appears from the results obtained that, generally speaking, the OH form of the resins has a very low adsorption ability, while the salt forms such as Cl and acetate forms have higher adsorption capacities. In particular, weakly basic anion exchange resins of the phenolaliphatic amine type such as for example Duolite A2 and Duolite A7 (commercial products available from Chemical Process Co., U.S.A.) in their Cl or acetate forms have a significantly high adsorption capacity.

When these weakly basic anion exchange resins are used in the above-mentioned process, the pH of the solution of UDP and/or UTP which is added to the resin should preferably be weakly acidic and better results can be achieved at a pH of 1.5–3.0. If the pH of the solution becomes too high, the amount of UDP or UTP adsorbed per unit volume of the resin will decrease. The similar results to those described above can also be obtained when inorganic or organic acid salt forms such as for example the sulphonic acid or formic acid forms of the resins are used.

The UTP or UDP thus adsorbed onto the weakly basic anion exchange resin can be eluted almost quantitatively with an aqueous alkaline solution. The aqueous alkaline solution may be for example, aqueous ammonia, or aqueous solutions of alkali metal hydroxides such as sodium hydroxide, lithium hydroxide and potassium hydroxide as well as aqueous solutions of organic bases such as trimethylamine, triethylamine, tripropylamine or tributylamine. The choice of the type of base employed may be determined by the particular phosphate desired. Although dilute or concentrated solutions may be used for the elution of UTP and/or UDP, it is preferred to use a concentrated solution of 0.5–1 N.

Figure 3:
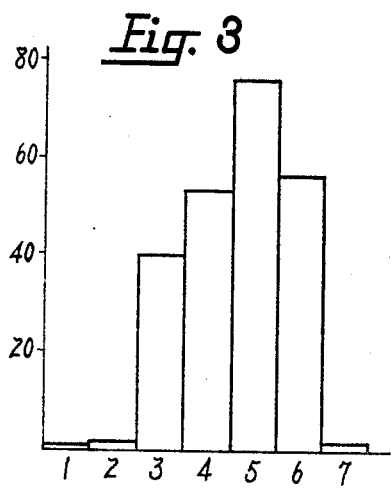
Figure 4:
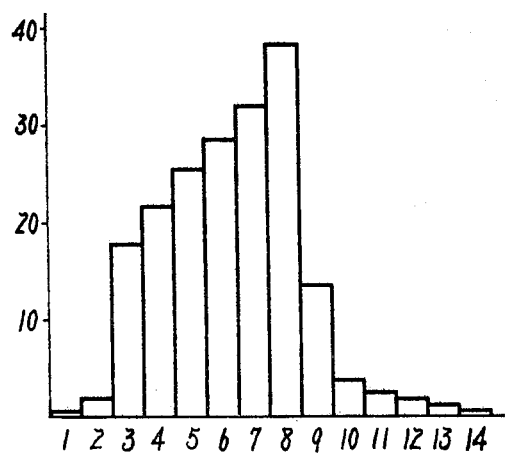

FIGURES 3 and 4 of the accompanying drawings show the relationship between the volume of the eluate and the concentration of the UTP or UDP contained therein when the UTP and/or UDP is adsorbed on Duolite A7 in its Cl form in the aforesaid manner. In particular, FIGURE 3 sets out the concentration of UDP in successive 10 ml. fractions of eluate obtained by eluting 10 ml. of the resin with an N lithium hydroxide solution.

Similarly, FIGURE 4 sets out the concentration of UTP in successive 5 ml. fractions of eluate obtained by eluting 10 ml. of the resin with an N lithium hydroxide solution.

The concentrations of UDP or UTP the eluate obtained in these cases are compared with those obtained by the use of a strongly basic anion exchange resin, Dowex 2 (a commercial product available from Dow Chemical Co., U.S.A.) and the results are set out in Tables 1 and 2.

TABLE 1.—COMPARISON OF THE ELUTION OF UDP USING DUOLITE A7 AND DOWEX 2

| | Dowex 2 | Duolite A7 |
|---|---|---|
| Volume of the resin used (ml.) | 20 | 10. |
| Amount of UDP adsorbed (grams) | 2 | 2. |
| Eluant | 0.1 N LiCl- 0.003 N HCl | N LiOH. |
| Eluting speed (ml./hour) | 400 | 400. |
| Maximum concentration of UDP in eluate (mg./ml.) | 7 | 73.6. |
| Total volume of eluate (ml.) | 5,000 | 40. |

TABLE 2.—COMPARISON OF THE ELUTION OF UTP USING DUOLITE A7 AND DOWEX 2

| | Dowex 2 | Duolite A7 |
|---|---|---|
| Volume of the resin used (ml.) | 100 | 100. |
| Amount of UTP adsorbed (grams) | 7 | 71. |
| Eluant | 0.3 N LiCl- 0.003 N NHCl | N LiOH. |
| Eluting speed (ml./hour) | 400 | 400. |
| Maximum concentration of UTP in eluate (mg./ml.) | 3.0 | 40. |
| Total volume of eluate (ml.) | 6,000 | 400. |

The eluate obtained by eluting the weakly basic anion exchange resin in the above-described manner may be subsequently evaporated to yield UTP or UDP, or the eluate may be treated with an organic solvent such as an alcohol, acetone etc., and UTP or UDP may be crystallised therefrom, the thus-obtained UTP and/or UDP having a high purity.

PREFERRED EMBODIMENT

The following examples illustrate the invention.

Example 1

10 litres of an aqueuos solution containing 15 mg./ml. of UTP, 1.0 mg./ml. of UDP, 0.2 mg./ml. of uridine-5′-monophosphate (hereinafter referred to as UMP) and trace amounts of phosphoric acid and pyrophosphoric acid, were passed at a flow rate of 20 litres per hour through a resin column packed with 10 litres of a strongly basic anion exchange resin, Dowex 2 (a commercial product available from Dow Chemical Co.) in its Cl form. The column was washed with water until the optical absorbance of the washings was observed to be sufficiently low. The resin was then washed with a 0.02 N HCl–0.05 M NaCl aqueous solution. UTP was eluted with a mixed solution of 0.03 N HCl and 0.3 M NaCl to give 17.5 litres of a UTP fraction containing 8.0 mg./ml. of UTP and having a pH of 1.5 (no UDP or UMP was identified). The pH of the solution was adjusted to 3.0 by addition of a 10 N sodium hydroxide solution and the fraction was then passed through three resin columns connected in series. Each column was packed with 1.5 litres of a skeletal weakly basic anion exchange resin, Duolite A7 (a commercial product available from Chemical Process Co.) in its Cl form and was eluted with 1 N sodium hydroxide solution at a flow rate of 400 ml./hour. The UTP fraction obtained from the first column amounted to 3.1 litres and contained 40 mg./ml. of UTP. 20 grams of UTP as UTP anhydride were recovered from the second column, while no UTP was recovered from the third column.

The UTP fraction recovered from the first column was adjusted to a pH of 3.5 by addition of concentrated hydrochloric acid and methanol was added gradually until the volume of methanol was 80% of the total volume. After leaving overnight at 0° C., the supernatant liquor was decanted off and the precipitated UTP was separated by centrifugation. The precipitate was dried in vacuo on $P_2O_5$ at ambient temperature to give 110 grams of crude UTP, which were dissolved in water at a concentration of 500 mg./ml. Ethanol was added to the solution until the volume of the ethanol was about 60% of the total volume. The crystals obtained were separated in a similar manner to that described above and were then freeze-dried to yield 120.5 grams of UTP·Na·$H_2O$ having a purity of 97.5%.

Example 2

10 litres of a 10% triethylphosphate aqueous solution of UTP containing 25 mg./ml. of UTP, 2 mg./ml. of UDP, 1 mg./ml. of UMP and a trace amount of inorganic phosphate, were passed through a resin column packed with 10 litres of a strongly basic anion exchange resin, Diaion SA-1 (a commercial product available from Mitsubishi Kasei Kogyo K.K., Tokyo, Japan) in its Cl form, in a similar manner to that described in Example 1. The UTP fraction was obtained in an amount of 30 litres which contained 80 mg./ml. of UTP and no UDP or UMP and was adjusted to a pH of 3.0 with addition of 10 N sodium hydroxide solution. The solution was then passed at a flow rate of 6 litres per hour through three resin columns, each of which were packed with 2 litres of Duolite A2 (a commercial product available from Chemical Product Co.), in its Cl form. After removing the first column from the series, 50 grams and 20 grams of UTP were recovered from the second and third columns respectively. 140.5 grams of UTP·Na·$H_2O$ having a purity of 97% were obtained from the UTP fraction of the first column in a similar manner to that described in Example 1.

Example 3

10 litres of an aqueous solution of UDP containing 1 mg./ml. of UTP, 20 mg./ml. of UDP, 2 mg./ml. of UMP and a trace amount of inorganic phosphate were passed at a flow rate of 20 litres/hour through a resin column packed with a strongly basic anion exchange resin, Dowex 2 (a commercial product available from Dow Chemical Co.), in its Cl form. The column was washed with water until the optical absorbance of the washings was sufficiently low. After washing the resin with a 0.003 N HCl–0.04 M NaCl aqueous solution, 20 litres of UTP fraction (pH=3.0) containing 9.5 mg/ml. of UDP and no UMP or UTP, were obtained by eluting the column with a 0.003 N HCl–0.1 M NaCl aqueous solution. The UDP fraction obtained was adjusted to a pH of 3.4 by the addition of 10 N sodium hydroxide solution and was then passed at a flow rate of 4 litres per hour through three resin columns connected in series, each of which was packed with 1.0 litres of a weakly basic anion exchange resin, Doulite A7 (a commercial product available from Chemical Process Co., U.S.A.) in its Cl form. After removal of the first column from the series, it was eluted with 1 N sodium hydroxide solution at a flow rate of 400 ml./hour and 3.2 litres of a UDP fraction containing 56 mg./ml. of UDP, were obtained therefrom; 8 grams of UDP as free UDP anhydride were recovered from the second column and no UDP was recovered from the third column. The UDP fraction obtained from the first column was adjusted to a pH of 4.5 by the addition of concentrated hydrochloric acid and methanol was added gradually until the volume of the methanol was about 80% of the total volume. After removal of the supernatant liquor, the residue was centrifugal to separate the precipitated UDP, which was then dried in vacuo on $P_2O_5$ at ambient temperature to give 180 grams of crude UDP·$Na_2$·$H_2O$.

The crude product obtained was dissolved in water to give a concentration of 700 mg./ml. and ethanol was then added gradually until the volume of the ethanol was about 70% of the total volume. The resulting crystals were separated in a similar manner to that described in Example 1 and were dried in vacuo on $P_2O_5$ at ambient temperature to yield 170 grams of UDP·$Na_2$·$H_2O$ having a purity of 98.5%.

What we claim is:

1. A process for separating at least one nucleotide selected from the group consisting of uridine-5'-diphosphate and uridine-5'-triphosphate from an aqueous solution containing said nucleotide, comprising contacting said aqueous solution with a strongly basic anion exchange resin in the salt form, eluting the nucleotide adsorbed on said strongly basic anion exchange resin with an acidic solution of at least one salt selected from the group consisting of an alkali metal salt and an acid addition salt of an organic base, contacting the eluate with a weakly basic anion exchange resin in the salt form and eluting the nucleotide adsorbed on said weakly basic anion exchange resin with an alkaline solution.

2. The process of claim 1 wherein the strongly basic anion exchange resin is in the salt form selected from the group consisting of chloride, bicarbonate, formate and acetate, the alkali metal salt is selected from the group consisting of lithium chloride, sodium chloride and potassium chloride and the acid addition salt of the organic base is selected from the group consisting of trimethylammonium bicarbonate, triethylammonium bicarbonate, tripropylammonium bicarbonate and tributylammonium bicarbonate.

3. The process of claim 2 wherein the weakly basic anion exchange resin is in the salt form selected from the group consisting of chloride, bicarbonate, formate and acetate and the nucleotide absorbed on the weakly basic anion exchange resin is eluted with a solution containing an inorganic base selected from the group consisting of ammonia and an alkali metal hydroxide or an organic base selected from the group consisting of trimethylamine, triethylamine, tripropylamine and tributylamine.

4. The process of claim 3 wherein the alkaline solution is 0.5 to 1.0 N.

5. The process of claim 2 wherein the acidic solution contains an acid selected from the group consisting of hydrochloric acid, sulfuric acid, nitric acid, formic acid and acetic acid.

6. The process of claim 1 wherein the pH of the eluate from the strongly basic anion exchange resin is adjusted to from 1.5 to 3.0 prior to contacting the eluate with the weakly basic anion exchange resin.

7. The process of claim 3 wherein the alkali metal hydroxide is selected from the group consisting of lithium hydroxide, sodium hydroxide and potassium hydroxide.

References Cited

UNITED STATES PATENTS

| 3,140,281 | 7/1964  | Okunuki et al. | 260—211.5 |
| 3,157,635 | 11/1964 | Tanaka et al.  | 260—211.5 |
| 3,157,636 | 11/1964 | Sanno et al.   | 260—211.5 |
| 3,157,637 | 11/1964 | Khym           | 260—211.5 |
| 3,278,517 | 10/1966 | Marumo et al.  | 260—211.5 |
| 3,366,627 | 1/1968  | Jacobs et al.  | 260—211.5 |

LEWIS GOTTS, Primary Examiner

J. R. BROWN, Assistant Examiner